(12) United States Patent
Kono et al.

(10) Patent No.: US 8,543,363 B2
(45) Date of Patent: Sep. 24, 2013

(54) METHOD FOR PREDICTING VOLUME CHANGE OF VOID GENERATED IN RESIN FILLED IN POROUS BODY, AND METHOD FOR ANALYZING FLOW OF RESIN MATERIAL IN POROUS BODY

(75) Inventors: Tsutomu Kono, Kawasaki (JP); Hiroki Nakatsuchi, Yokohama (JP); Keiji Suzuki, Hitachi (JP); Mitsuru Onoda, Takahagi (JP); Kazuo Goto, Mito (JP); Yasuaki Kageyama, Hitachi (JP); Hiroaki Kojima, Hitachi (JP); Kenji Ikeda, Hitachinaka (JP); Hisashi Morooka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 381 days.

(21) Appl. No.: 12/942,094

(22) Filed: Nov. 9, 2010

(65) Prior Publication Data

US 2011/0112812 A1    May 12, 2011

(30) Foreign Application Priority Data

Nov. 11, 2009   (JP) ................................ 2009-258364

(51) Int. Cl.
*G06G 7/50*   (2006.01)

(52) U.S. Cl.
USPC .......................................................... 703/9

(58) Field of Classification Search
USPC .......................................................... 703/9
See application file for complete search history.

(56) References Cited

U.S. PATENT DOCUMENTS

2008/0234989 A1   9/2008 Saeki et al.

FOREIGN PATENT DOCUMENTS

| JP | 2005-017228 | 1/2005 |
| JP | 2008-230089 | 10/2008 |
| WO | WO 2008/044571 A1 | 4/2008 |

OTHER PUBLICATIONS

Sevostianov et al.; Mathematical model of cavitation during resin film infusion process; Composite Structures 48 (2000) 197-203.*
Dupret et al.; Modelling and simulation of injection molding; (in Advances in the Flow and Rheology of Non-Newtonian Fluids); vol. 8, 1999, pp. 939-1010.*
Jones et al.; Development of pulsed dielectric breakdown in liquids; J. Phys. D Appl. Phys. 28 (1995) 178-188.*
Jones et al.; Pulsed dielectric breakdown of pressurized water and salt solutions; J. Appl. Phys. 77 (2), Jan. 1995; pp. 795-805.*
'Numerische Strö mungsmechanik,' (in German, 3 pgs.); [with English language translation—'Computational Fluid Dynamics', 6 pgs., (Wikipedia, Internet: //en.wikipedia.org/wiki/Computational_fluid_dynamics)].

* cited by examiner

*Primary Examiner* — Hugh Jones
(74) *Attorney, Agent, or Firm* — Antonelli, Terry, Stout & Kraus, LLP.

(57) ABSTRACT

The present method aims at preventing breakdown by selecting conditions for preventing the occurrence of voids via analysis. According to the present method, a database related to the time variation of amount of generated gas or number of moles when a solid member is heated is experimentally formulated in advance, and the amount of generated gas from the member and the specific heat ratio of gases are entered for analysis in order to predict via analysis the generation of voids within the resin material when the solid member is heated, to thereby select conditions for preventing voids.

3 Claims, 12 Drawing Sheets

DIMENSION IN X-AXIS DIRECTION: 2 mm

METHOD FOR PREDICTING VOLUME CHANGE OF VOID GENERATED IN RESIN FILLED IN POROUS BODY, AND METHOD FOR ANALYZING FLOW OF RESIN MATERIAL IN POROUS BODY

The present application is based on and claims priority of Japanese patent application No. 2009-258364 filed on Nov. 11, 2009, the entire contents of which are hereby incorporated by reference.

BACKGROUND OF THE INVENTION

1. Field of the Invention

The present invention relates to a method for predicting volume change of void which is a space formed within a resin material arranged in contact with a solid member or a resin material filled in a porous body in contact with a solid member due to the generation of gas when the temperature of the solid member, the porous body or the resin material is raised, and a method for analyzing flow of the resin material in the porous body.

The voids in the resin material arranged in contact with the solid member may be caused by gases generated from the solid member, the porous body or the resin material when heated. By experimentally formulating a database on the time variation of the amount of generated gas or the number of gas moles when the solid member, the porous body or the resin material is heated, and using the data as the input for analysis, it becomes possible to predict via analysis the change in void volume in the resin when the solid member or the like is heated.

Further, when the resin is filled in a porous body formed for example of glass fibers having interfiber spaces in contact with a solid member, if the fiber layers are modeled for analysis based on its original configuration, the modeling time and calculating time may become too long. Therefore, when resin flows in the porous body, the flow is calculated using a flow resistance factor of the porous body, which is a function including the viscosity of the resin material and the cross-sectional specific resistance. At this time, the cross-sectional specific resistance of the porous body may differ between a thickness direction in which the dimension of the fiber layer is minimum and a direction orthogonal to the thickness direction, so the thickness direction of the porous body is calculated via analysis, and the specific resistance in the thickness direction and the specific resistance in the direction orthogonal to the thickness direction are entered independently.

2. Description of the Related Art

Patent document 1 (Japanese patent application laid-open publication No. 2008-230089) and patent document 2 (international publication No. 2008/044571) are examples of known patent documents related to the method for analyzing flow of resin material. Patent document 1 discloses an art related to a method for calculating the resin flow within a porous body by entering a pressure loss in the three-dimensional direction as a product of the aforementioned cross-sectional specific resistance, viscosity, rate and flow distance. However, the document lacks to disclose a method for calculating the void volume generated in the porous body. Further, though the disclosed art enables to set independent values for various three-dimensional directions regarding the cross-sectional specific resistance of the porous body, the art does not enable to calculate the thickness direction of the porous body and to enter the cross-sectional specific resistance in the thickness direction of the porous body.

Further, patent document 2 discloses a method for analyzing flow of resin material and particles filled in the resin when viscosity is changed in response to the change of temperature of the resin material, but the document lacks to disclose a method for calculating the void volume generated in the resin.

SUMMARY OF THE INVENTION

When voids occur within the resin constituting an insulation layer, drawbacks occur such as the generation of discharge caused by insulation breakdown when high voltage is applied thereto. One cause of voids is the gases generated when the solid member including organics arranged in contact with resin, the porous body as the insulating layer or the resin material are heated. In order to prevent the occurrence of voids by gas generation, it is necessary to consider changing the heating conditions, changing the materials of the solid member or the porous body, changing the material or the property of the resin such as the viscosity variation, and conditions for preliminary drying performed before molding. However, the experimental studying of such contents require much cost and extended development period.

The problems of the prior art can be solved by developing an analysis method for predicting voids caused by gases generated from the solid member, the porous body or the resin material, and utilizing the analysis method to select conditions for preventing voids.

In order to solve the problems of the prior art mentioned above, the present invention adopts a general-purpose flow analysis program (FLOW-3D by Flow Science Inc.) to experimentally formulate in advance a database regarding the time variation of quantity or number of moles of generated gas when the solid member, the porous body or the resin material is heated, and to utilize the database as input for analysis, according to which the generation of voids in resin when heated can be predicted via analysis.

At this time, a function formula including the viscosity resin temperature is entered to calculate the change of resin viscosity caused by the rising of temperature of the resin material in contact with the solid member, and to calculate the change in gas volume generated from the solid material. In other words, if gas is generated from the solid member with the resin viscosity is increased, the void volume will not be increased freely, and as a result, the inner pressure of the void is increased.

Further, if resin is filled in the space between a solid member and fibers of a fiber layer composed of glass fiber or the like arranged in contact with the solid member, the fiber layer is set as a porous body, and resin is set to be arranged within the porous body. Then, a function including a cross-sectional specific resistance and viscosity is calculated as the flow resistance factor of the porous body, and a product of the flow resistance factor of the porous body, the flow rate of resin and density is calculated as the external force per unit volume via flow resistance.

Now, when the cross-sectional specific resistance of the porous body is high, the void volume cannot be increased greatly similar to when viscosity is increased, and as a result, the inner pressure of the void is increased.

Further, the cross-sectional specific resistance of the porous body may differ between the thickness direction in which the dimension of a perpendicular from the inner side of the porous body is minimum and a direction orthogonal to the thickness direction, so the thickness direction of the porous body is calculated via analysis, and a specific resistance in the thickness direction and a specific resistance in the direction orthogonal to the thickness direction are entered independently for calculation.

According to the present invention providing a method for predicting the volume of voids within the resin for forming an insulation layer, it becomes possible to compute via calculation the change of void volume caused by gases generated when heating the solid member including organics arranged in contact with resin, the porous body constituting the insulation layer, or the resin material. By adopting the present calculation method, it becomes possible to predict via analysis the change of heating conditions, change of material of the solid member, or the resin property such as the change of resin viscosity, so that the void volume generated in the resin by gases generated from the solid member, the porous body or the resin material falls within a specified value.

DETAILED DESCRIPTION OF THE PREFERRED EMBODIMENTS

Figure 1C:
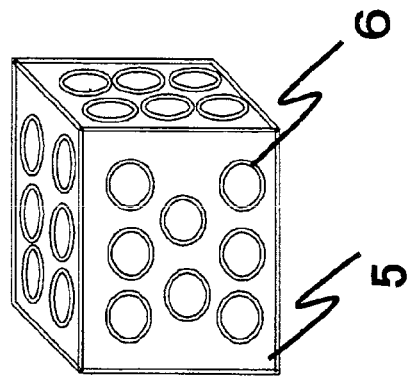
FIG. 1C is a model configuration of the porous body of the process of increase of void volume within the resin filled in the porous body.

Now, the preferred embodiments of the present invention will now be described with reference to the accompanying drawings. At first, the molding process being the object of analysis will be described with reference to FIGS. 1A, 1B and 1C. In the initial state (FIG. 1A), a resin material 2 filled in a porous body 5 and a resin material 3 are arranged in contact with a solid member 4, wherein an initial void 1 being the initial space exists within the resin material 2 filled in the porous body 5.

Figure 1B:
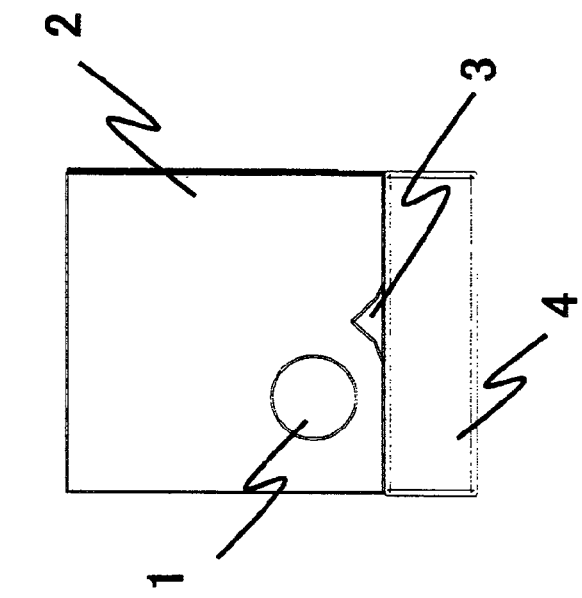
FIG. 1B shows a state in which the void volume is increased during the process of increase of void volume within the resin filled in the porous body.
Figure 1A:
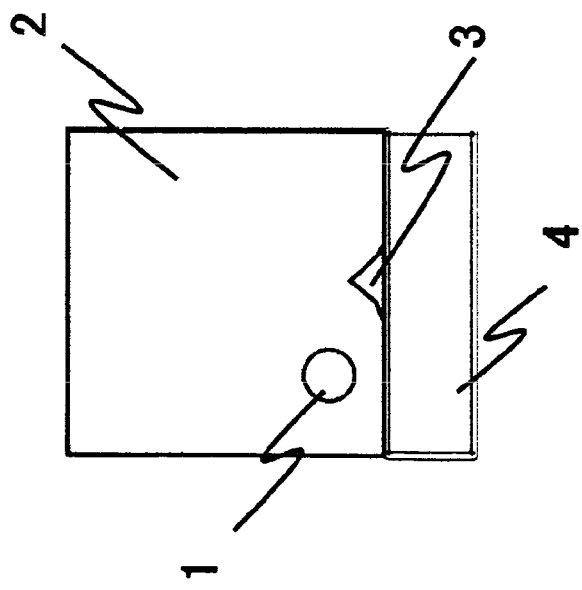
FIG. 1A shows an initial state of the process of increase of void volume within a resin filled in a porous body.

FIG. 1B shows a state in which the volume of void 1 within the resin has increased when the temperature of the resin material 3 including the solid member 4 and the resin material 2 filled in the porous body 5 is raised. Now, if the solid member 4 contains organic materials or moisture, the gas generated from the solid member 4 when the temperature is raised causes the volume of the void 1 to increase. Further, gases may also be generated when the temperature of the porous body 5 or the resin material 2 is raised, causing the volume of the void 1 to increase. However, if the resin viscosity is high, the volume of void 1 will not be increased freely. Therefore, the increase of volume of void 1 is determined by the gases mainly generated from the solid member 4 containing an organic material and by the change of resin viscosity.

FIG. 1C shows a model configuration of the porous body 5. As illustrated, the model configuration of the porous body 5 includes a plurality of tubes 6, wherein the tubes are filled with resin. Further, regarding the resin flow analysis in the tubes 6 of the porous body 5 of FIG. 1C, a flow resistance factor of the resin material 3 in the porous body 5 is entered as a function including a cross-sectional specific resistance and viscosity of resin for calculation.

As an example of equation of the flow resistance factor K of the porous body 5, a value calculated via equation (16) can be entered, when the cross-sectional specific resistance of the porous body is $\beta$ and the resin viscosity is $\eta$.

$$K = \eta \cdot \beta \tag{16}$$

The porous body 5 can be formed for example of glass fiber or mica fiber, and the resin material 3 can be formed for example of thermosetting resin such as epoxy and phenol or thermoplastic resin such as polycarbonate and polystyrene.
[Configuration of Analysis System]

Next, we will describe an analysis system used for predicting the change of void volume and the flow process of the resin material 3. The analysis system functions by executing a software including the flow of FIGS. 3 and 5 described in detail later via a hardware configuration illustrated in FIG. 2.

Actually, the hardware configuration comprises a computing device 6, a computing device 7 equipped with a storage device 10 (such as a hard disk or MO), a LAN 8 connecting the two computing devices, and a display device 9 equipped in the computing device 7. Further, it is possible to adopt an arrangement in which a CAD data created in a computing device 14 is transferred via a LAN 8 to the computing device 7. The CAD data transferred to the computing device 7 can be stored in the storage device 10 (such as the hard disk and MO) of the computing device 7 for use.

Figure 3:
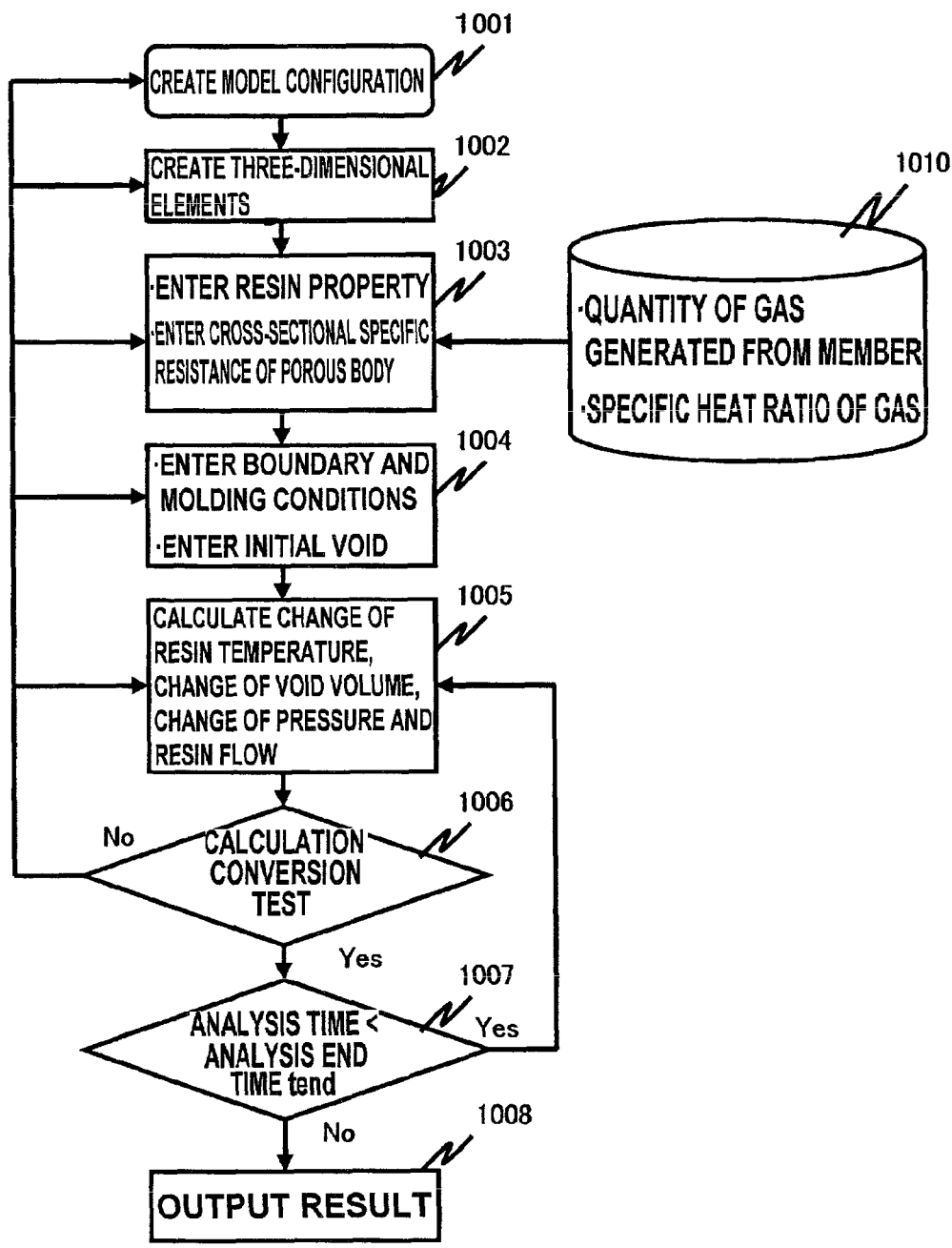
FIG. 3 shows a flowchart 1.
Figure 5:
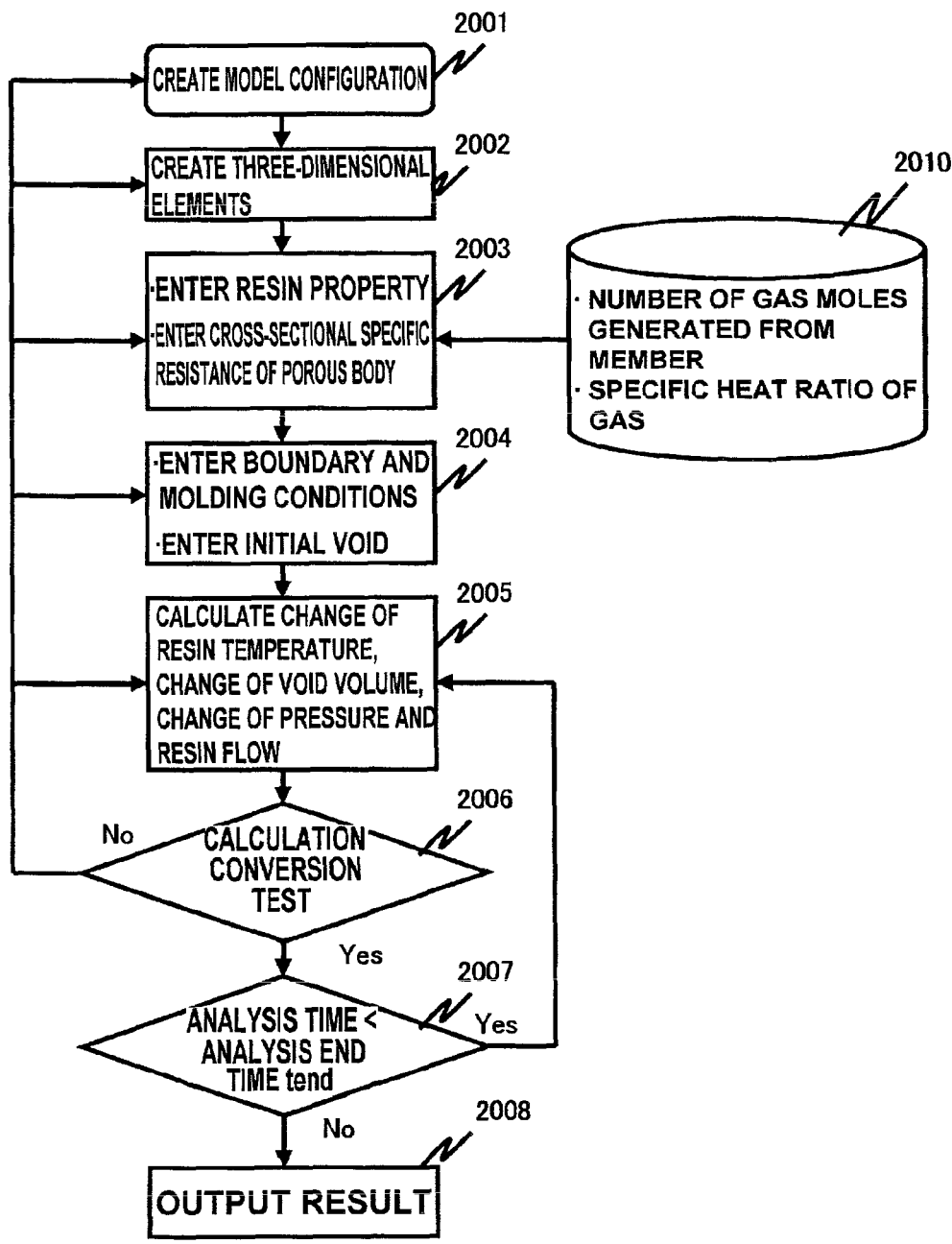
FIG. 5 shows a flowchart 2.

The computing device 7 executes calculation based on the flowchart shown in FIGS. 3 and 5, stores the result in a storage device 10, and displays the result on a display device 9. Although not shown, the computing devices 6 and 7 are equipped with input devices such as a keyboard and a mouse.
[Flowchart]

Next, the process of the analysis program will be described with reference to the flowchart of FIG. 3.

First, in a model configuration creating step 1001, a model being the object of analysis specified by the operator via an input device, in other words, the configuration of the porous body 5 filled with resin material, the spatial configuration in which the resin material 3 is filled in contact with the porous body 5, and the data regarding the solid member 4 in contact with the flow region of the resin, is read out from the storage device 10.

Next, in step 1002 for creating a three-dimensional solid element, the data configuration read out in the model configuration creating step 1001 is dissolved into a plurality of specific spaces (finite elements of three-dimensional solid elements), and configuration data of the finite elements are created.

Thereafter, in a property input step 1003, a display is displayed to prod the operator to enter properties of the material to be analyzed, that are, the density, the thermal conductivity, the specific heat, the initial temperature, the heat generation equations (equation 7) through (equation 11) and the viscosity equations (equation 12) through (equation 15) of the resin material 3, the aperture ratio of the porous body 5, the cross-sectional specific resistance of the porous body 5, and the properties of the porous body 5 including the density, the specific heat and the thermal conductivity thereof, wherein these data are received from the input device.

In the equation, A represents reaction rate, t represents time, T represents temperature, dA/dt represents reaction speed, K1 and K2 represent coefficients being the functions of temperature, N, M, Ka, Ea, Kb and Eb represent coefficients specific to the materials, Q represents the heating value to an arbitrary time, Qo represents the gross heating value to the termination of reaction, dQ/dt represents heat generation rate, η represents viscosity, η0 represents initial viscosity, t represents time, tO represents gelation time, T represents temperature, and a, b, d, e, f and g represent constants specific to the material.

Next, in step 1010, a display is displayed to prod the operator to enter the time variation of the volume of a single gas or a total volume of a plurality of gases generated from the solid member 4, the porous body 5 or the resin material 2 formulated via measurement performed by experiment, and the specific heat ratio of the single or the plurality of gases, wherein these data are received from the input device.

Figure 4:
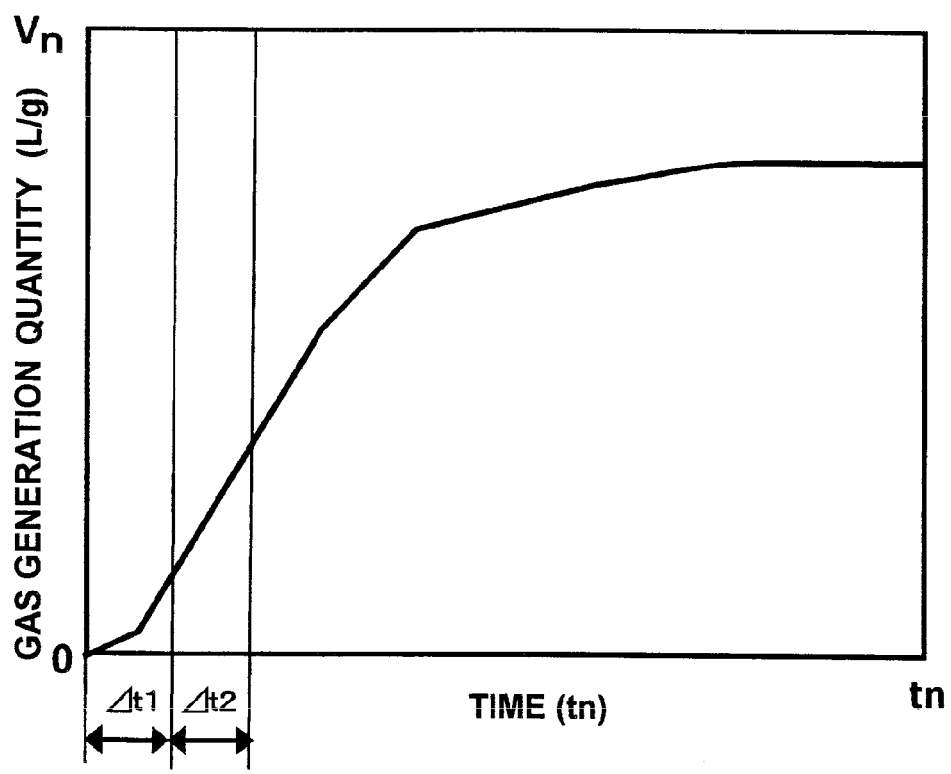
FIG. 4 shows a database regarding the time variation of gas generation quantity.

FIG. 4 shows a database regarding the time variation of the quantity of generated gas. In the drawing, the time variation of volume per unit weight of the plurality of gases of the solid member 4 measured experimentally is shown.

As for the specific heat ratio, the time variation of the specific heat calculated either from the average value of the plurality of gases or from the volume ratio of the plurality of gases is entered.

Next, in a boundary condition and molding condition entry step 1004 of FIG. 3, a display is displayed to prod the operator to enter the initial temperature of the porous body 5 and the solid member 4 in contact with the flow region of resin, the initial temperature of the resin material 3, the temperature variation of the solid member 4, the boundary conditions including the boundary pressure of the analysis object, and the volume and pressure of the initial void 1 within the resin, wherein these data are received from the input device.

Next, a command to start analysis from the operator, an initial time increment and an analysis end time tend are received.

Further, the analysis is performed by incrementing minute times and calculating the variation per each time step, wherein time increment refers to the interval of the time steps.

Based on this command, step 1005 invokes the equation of continuity (3), the Navier-Stokes equation (4) and the energy conservation equation (5) stored in the storage device, assigns the values received as input in the database such as the initial time increment, the properties of the resin material 3 including the heat generation equations (equation 7) through (equation 11) and the viscosity equations (equation 12) through (equation 15), the properties of the porous body 5 including the cross-sectional specific resistance thereof, the boundary conditions including the temperature variation of the solid member 4 and the time variation of the gas volume generated from the solid member 4, and calculates contents including the temperature variation of the resin material 3 accompanying the temperature variation of the solid member 4, the viscosity, and the variation of volume of void 1 caused by the generation of gas from the solid member 4. The result of calculation is associated with the positions of the finite elements and stored in the storage device.

In the equation, u represents flow rate, P represents pressure, ρ represents density, G represents gravity acceleration, η represents viscosity, C represents specific heat, K represents thermal conductivity, T represents temperature, Q represents heating value, γ represents shear rate, and K represents flow resistance factor ($K=\eta \cdot \beta$ from equation (16)) of the porous body 5.

In the initial time increment of analysis (first step), the initial time is set as t0, and the time increment is set as $\Delta t1=t1-t0$, wherein the gas volume dV1 generated at the initial time increment of the initial void 1 having a pressure P0 and volume V0 at initial time t0 is calculated based on the time variation of gas volume generated from the solid member 4 entered in step 1010, wherein regarding the initial time increment, the resin temperature is set to average temperature T1 (constant) and the void 1 temperature is set equal to resin temperature.

The inner pressure P0+dP1 of void 1 when the void 1 volume is not varied from V0 is calculated based on equation (1) by $P0(V0+dV1)^\gamma=(P0+dP1)V0^\gamma$.

Further, similarly by using equation (1), regarding the initial time increment, the pressure P1 and volume V1 of the void 1 at time t=t1 is calculated via fluid analysis using $(P0+dP1)V0^\gamma=P1V1^\gamma$, and the resin flow accompanying the volume variation of void 1 is calculated.

In step 1006 of FIG. 3, a calculation convergence test is performed. The conversion test is performed for example by determining convergence when the ratio of rate and element length falls within a predetermined range. If convergence is not determined, the calculation in step 1005 is repeated, and when convergence is not determined even when the calculation is repeated for a determined number of times, the procedure returns to any one of steps 1001 through 1004. When the procedure returns to steps 1001 through 1004, the operator is prodded to enter which step the procedure returns to.

When the calculation is converged, it is determined in step 1007 whether the analysis time is shorter than a preset analysis end time tend, wherein if the result is no, the analysis is terminated, and if the result is yes, the procedure returns to the calculation of step 1005, and the calculation of the subsequent time step is performed.

In the second step of calculation in step 1005, the time increment is set to $\Delta t2=t2-t1$, and the void pressure P1 and the void volume V1 at time t=t1 are entered based on the calculation result of the first step, wherein the gas volume dV2 generated in the time region of time increment $\Delta t2$ is calculated based on the time variation of gas volume generated from the solid member entered as mentioned earlier by setting the void volume to V1 (constant) at time t1.

Regarding time increment $\Delta t2$, the void inner pressure P1+dP2 when the average temperature is set to T2 (constant) and the void volume is not varied from V1 is calculated by equation (1) wherein $P1(V1+dV2)^\gamma=(P1+dP2)V1^\gamma$.

Similarly using equation (1), regarding time increment $\Delta t2$, the pressure P2 of void 1 and the volume V2 of void 1 at time t=t2 is calculated via fluid analysis using $(P1+dP2)V1^\gamma=P2V2^\gamma$, and the resin flow accompanying the volume variation of the void 1 is calculated.

In step 1006, the convergence test of the calculation is performed, and when conversion is not determined, the calculation of step 1005 is repeated or the procedure returns to any one of steps 1001 through 1004. When the procedure returns to any one of steps 1001 through 1004, the operator is prodded to determine which step the procedure returns to.

When it is determined that calculation has converged, the calculation of step 1005 is repeated until the time of analysis reaches the preset analysis end time tend, and in step 1007, the analysis is ended when the analysis time reaches the preset analysis end time tend.

Regarding the input condition of step 1010, the time variation of gas volume generated per unit weight of the solid member 4 during temperature elevation is shown as illustrated in FIG. 4, but the time variation of gas volume corresponding to the weight of the solid member 4, or a value having added the time variation of gas volume generated per unit volume of the solid member 4, or the time variation of gas volume generated from the resin material 3 or the porous body 5 can be entered.

Further, regarding the specific heat ratio of the generated gases, when there are a plurality of gases, equation (6) shows the specific heat ratio $\gamma 1a$ of the overall gases generated from the solid member between the time range tn1 to tn2, when the specific heat ratio of n gases generated from the solid member 4 are $\gamma 11$, $\gamma 12$, $\gamma 1n$ and the volume of n gases generated from the solid member are V11, V12, ..., V1n at a time range tn1 to tn2 including temperature rising processes of the plurality of gases.

The time variation of the specific heat ratio of the overall gases generated from the solid member calculated via equation (6) can be entered and used in the various time steps of calculation.

Furthermore, the heat generation equations are not restricted to equations 7 through 11, and can use arbitrary functions including the reaction rate of the resin material 3.

Moreover, the viscosity equations are not restricted to equations 12 through 15, and can use arbitrary functions including the temperature or reaction rate of the resin material 2. Further, the convergence test can utilize any arbitrary determination method. Moreover, not only three dimensional analysis but two dimensional analysis can also be performed. The calculations mentioned above can be performed using a finite element method, a finite volume method or a finite difference method.

Further, in step 1010, the database of gas generation quantity from the solid member 4 was entered, but the present invention is not restricted thereto, and it is possible to experimentally formulate a database of the gas generation quantity from the porous body 5 or the resin material 2, and to enter the same in addition to the database of the gas generation quantity from the solid member 4.

[Flowchart 2]

Next, the process of the analysis program will be described with reference to the flowchart of FIG. 5. First, in a model configuration creating step 2001, an analysis object model specified by the operator via an input device, in other words, the configuration of the porous body 5 filled with resin material, the spatial configuration in which the resin material 3 is filled in contact with the porous body 5, and the data regarding the solid member 4 in contact with the flow region of the resin, are read out from the storage device 10.

Next, in step 2002 for creating a three-dimensional solid element, the data configuration read out in the model configuration creating step 2001 is dissolved into a plurality of specific spaces (finite elements of three-dimensional solid elements), and the configuration data of the finite elements are created.

Thereafter, in a property input step 2003, a display is displayed to prod the operator to enter the properties of the material being the object of analysis, that are, the density, the thermal conductivity, the specific heat, the initial temperature, the heat generation equations (equation 7) through (equation 11), and the viscosity equations (equation 12) through (equation 15) of the resin material 3, the aperture ratio of the porous body 5, the cross-sectional specific resistance of the porous body 5, and the properties of the porous body 5 including the density, the specific heat and the thermal conductivity, wherein these data are received from the input device.

Next, in step 2010, a display is displayed to prod the operator to enter the time variation of the number of moles of a single gas or a total number of moles of a plurality of gases generated from the solid member 4, and the specific heat ratio of the single or the plurality of gases, wherein these data are received from the input device.

Now, the database regarding the time variation of the number of moles generated from the solid member 4 utilizes the time variation of the number of moles per unit weight of the plurality of gases measured experimentally.

As for the specific heat ratio, the time variation of the specific heat calculated either from the average value of the plurality of gases or from the volume ratio of the plurality of gases is entered.

Next, in a boundary condition and molding condition entry step 2004, a display is displayed to prod the operator to enter the initial temperature of the solid member 4, the initial temperature of the resin material 3, the temperature variation of the solid member 4, the boundary conditions including the boundary pressure of the analysis object, and the volume, pressure and temperature of the initial void 1 within the resin, wherein these data are received from the input device.

Next, a command to start analysis from the operator, an initial time increment and an analysis end time tend are received. Further, the analysis is performed by incrementing minute times and computing the variation per each time step, wherein time increment refers to the interval of the time steps.

Based on this command, step 2005 invokes the equation of continuity (3), the Navier-Stokes equation (4) and the energy conservation equation (5) stored in the storage device, assigns the values received as input in the database such as the initial time increment, the properties of the resin material 3 including the heat generation equations (equation 7) through (equation 11) and the viscosity equations (equation 12) through (equation 15), the properties of the porous body 5 including the cross-sectional specific resistance, the boundary condition including the temperature variation of the solid member 4 and the time variation of the gas volume generated from the solid member 4, and calculates contents including the temperature variation of the resin material 3 accompanying the temperature variation of the solid member 4, the viscosity, and the variation of volume of void 1 caused by the generation of gas from the solid member 4.

The result of computation is associated with the positions of the finite elements and stored in the storage device. In the initial time increment of analysis (first step), the initial time is set to t0, the time increment is set to $\Delta t1=t1-t0$, and the initial void 1 having a pressure P0, a volume V0 and a temperature T0 at time t=t0 is set, wherein the initial number of gas moles n0 is calculated based on (P0V0=n0 RT0) from state equation (2), wherein the specific heat ratio of the generated gas is $\gamma$, and the initial void 1 volume during initial time increment t=t0 to t1 is V0 (constant) at time t0, and the generated number of gas moles n1 is calculated from the time variation of the number of gas moles generated from the solid member entered in step 2010. Regarding the initial time increment, the resin temperature is set to average temperature T1 (constant) and the void 1 temperature is set equal to resin temperature, and during t=t0 to t1, the inner pressure P1 of void 1 varied via temperature rise and increase of number of moles when the void 1 volume is not varied from V0 is calculated by (P1V0=(n0+n1)RT1) based on state equation (2).

The pressure P1' and volume V1 of the void 1 during t=t0 to t1 is calculated via fluid analysis by $P1V0\char`\^\gamma=P1'V1\char`\^\gamma$ using average temperature T1 (constant) and using equation (1)

including the pressure and volume of void 1, and the resin flow accompanying the volume variation of void 1 is calculated.

In step 2006, a calculation convergence test is performed. The conversion test is performed for example by determining convergence when the ratio of rate and element length falls within a predetermined range. If convergence is not determined, the calculation in step 2005 is repeated, and when convergence is not determined when the calculation is repeated for a determined number of times, the procedure returns to any one of steps 2001 through 2004. When the procedure is to return to any one of steps 2001 through 2004, the operator is prodded to enter which step the procedure is returned to.

When the calculation is converged, it is determined in step 2007 whether the analysis time is shorter than a preset analysis end time tend, wherein if the result is no, the analysis is terminated, and if the result is yes, the procedure returns to the calculation of step 2005, and the calculation of the subsequent time step is performed.

In the second step of calculation in step 2005, the time increment is set to $\Delta t2=t2-t1$, and from step 1, the pressure at $t=t1$ is P1' and the volume is V1, and during $t=t1$ to t2, the void 1 volume is set to V1 at t1 (constant), and based on the time variation of the number of gas moles generated from the solid member entered as mentioned earlier, the number of moles n2 generated in this time region is calculated.

During time $t=t1$ to t2, the pressure P2 within the void varied via temperature rise and increase of number of gas moles when the volume of void 1 is not varied from V1 is calculated according to equation (2).

During time $t=t1$ to t2, by using average temperature T2 (constant), the pressure and volume P2' and V2 of the void 1 at time $t=t2$ is calculated via fluid analysis using the aforementioned equation (1) including the pressure and volume of void 1 based on $P2V1^\gamma=P2'V2'^\gamma$, and the resin flow accompanying the volume variation of the void 1 is calculated.

In step 2006, the convergence test of the calculation is performed. The convergence test of the calculation is performed for example by determining that the calculation is converged when the ratio of the rate and element length falls within a predetermined range. When it is determined that the calculation is not converged, the calculation of step 2005 is repeated, and when the calculation is still not converged after the calculation is repeated for a predetermined number of times, the procedure returns to any one of steps 2001 through 2004. When the procedure returns to any one of steps 2001 through 2004, the operator is prodded to determine which step the procedure returns to.

When it is determined that calculation has converged, the calculation of step 2005 is repeated until the time of analysis reaches the preset analysis end time (tend), and in step 2007, the analysis is ended when the analysis time reaches the preset analysis end time tend.

Regarding the input condition in step 2010, the time variation of the number of gas moles generated per unit weight of the solid member 4 during temperature elevation is shown, but the database related to the gas generation quantity such as the time variation of gas volume corresponding to the weight of the solid member 4, or the time variation of the number of gas moles generated per unit volume of the solid member 4 can be used.

Further in step 2010, the database regarding the gas generation quantity from the solid member 4 was entered, but the present invention is not restricted thereto, and it is possible to experimentally formulate a database on the gas generation quantity from the porous member 5 or the resin material 2, and to enter the same in addition to the database on the gas generation quantity from the solid member 4.

Further, regarding the specific heat ratio of the generated gases, the value calculated in the aforementioned equation (6) can be used. Furthermore, the heat generation equations are not restricted to equations 7 through 11, and can use arbitrary functions including the reaction rate of the resin material 3.

Moreover, the viscosity equations are not restricted to equations 12 through 15, and can use arbitrary functions including the temperature or reaction rate of the resin material 2. Further, the convergence test can use any arbitrary determination method. Moreover, not only three dimensional analysis but two dimensional analysis can also be performed. The calculations mentioned above can be performed using a finite element method, a finite volume method or a finite difference method.

Now, the cross-sectional specific coefficient of the porous body 5 entered in step 1005 of the flowchart of FIG. 3 and in step 2005 of the flowchart of FIG. 5 may differ between a thickness direction in which the perpendicular line from the respective elements to the end of the porous body 5 is shortest and other directions. This is due to the porous body 5 being formed by laminating thin layers of tapes.

Figure 6:
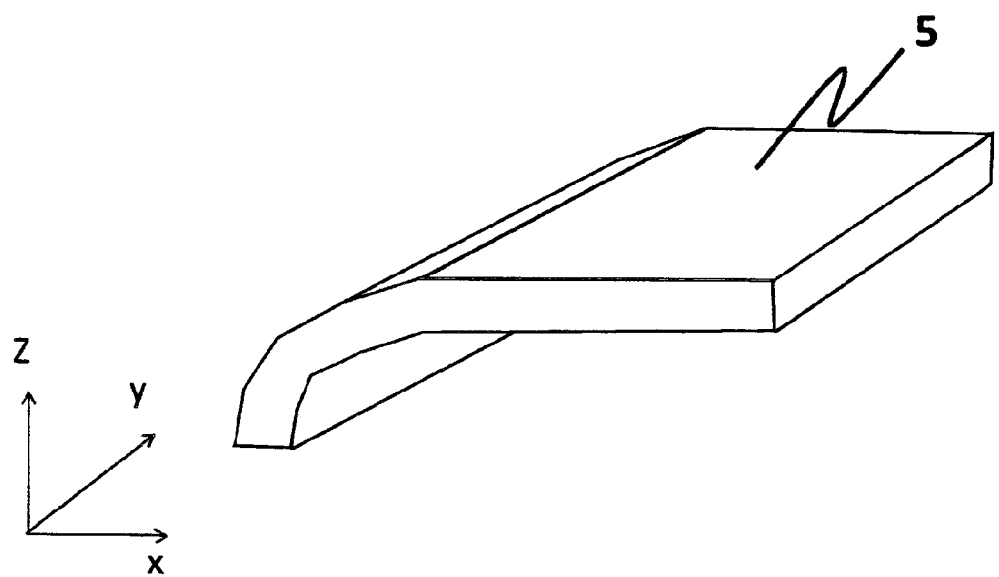
FIG. 6 shows a configuration of the porous body.

FIG. 6 shows an example of the configuration of the porous body 5. In the flat panel section of FIG. 6, it is possible to set up a varied cross-sectional specific resistance in the thickness direction by entering the cross-sectional specific resistance in the z-axis direction. However, in the curved section of FIG. 6, it is difficult to set up the cross-sectional specific resistance only in the thickness direction.

Figure 7:
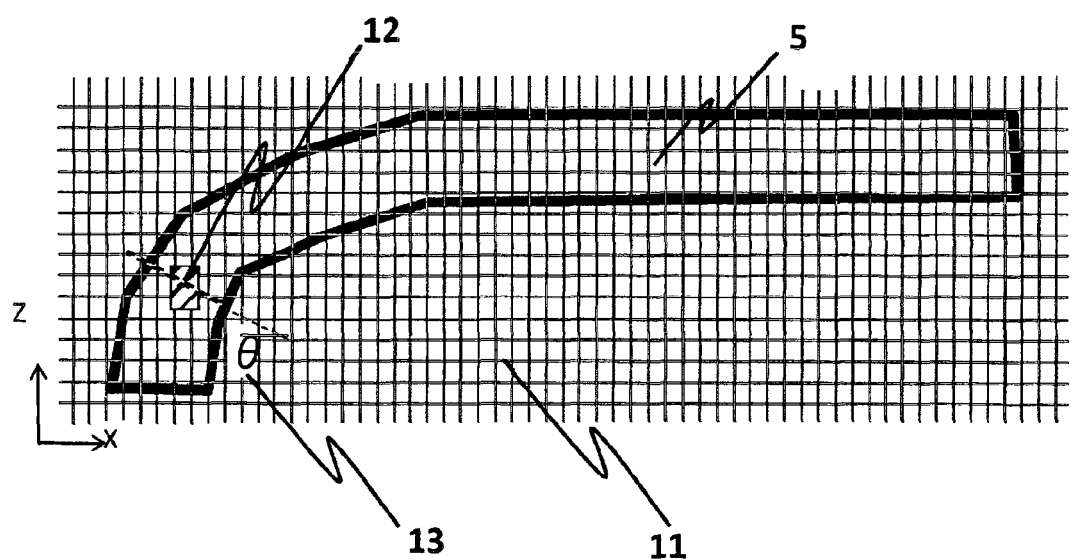
FIG. 7 is an X-Z cross-sectional shape of the porous body.

FIG. 7 shows a cross-section in the X-Z plane of the configuration of the porous body 5 illustrated in FIG. 6. Here, the configuration is divided into finite and multiple square solid elements 11.

Here, an arbitrary number of perpendicular lines orthogonal to the X, Y and Z axes are drawn from an arbitrary contact point of a solid element shown in FIG. 7, and the minimum perpendicular line within the porous body is set as the thickness direction of each solid element.

Regarding element A12 shown in FIG. 7, the perpendicular line orthogonal to the Y axis is minimum, so the thickness direction exists within the XZ plane, wherein an angle 13 between the X axis and the perpendicular in the thickness direction is referred to as θ. When β1 represents the aforementioned cross-sectional specific resistance in the thickness direction, β2 represents the aforementioned cross-sectional specific resistance in the XZ plane orthogonal to the thickness direction, and β3 represents the flow resistance in the Y axis direction orthogonal to the thickness direction, the following equation is calculated:

$$\beta x1 = |\beta1 \cos\theta| + |\beta2 \sin\theta|$$

Figure 2:
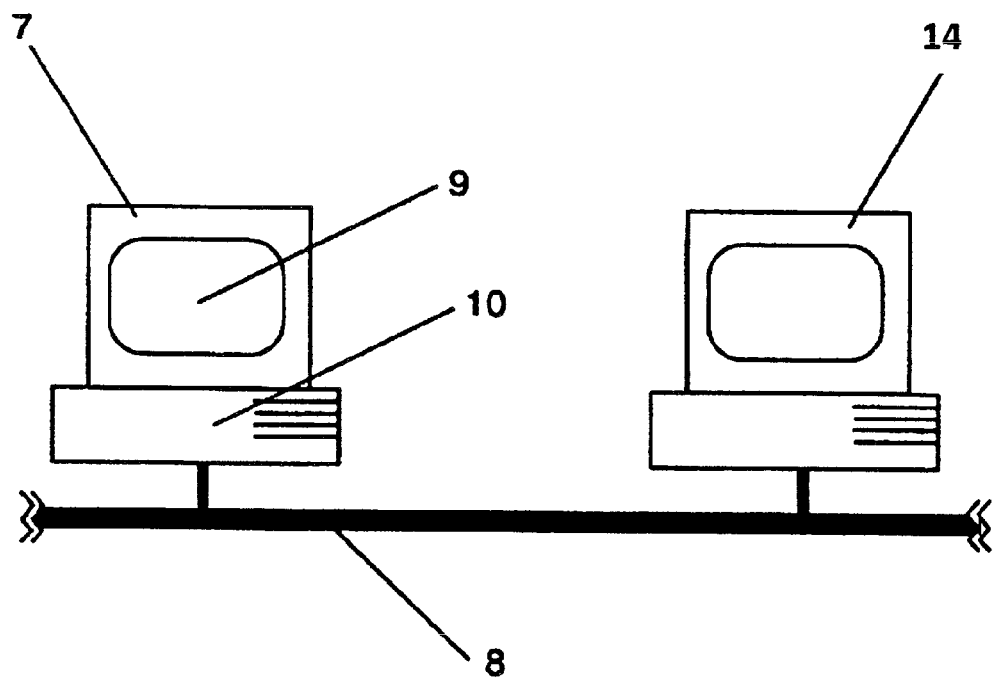
FIG. 2 is a view showing a hardware configuration for performing flow analysis.

If βx1 is smaller than β1 or β2, the cross-sectional specific flow resistance in the X axis direction is set as βx1, and if βx1 is equal to or greater than β1 or if βx1 is equal to or greater than β2, then the greater one of β1 or β2 is set as the flow resistance specific to the material in the x-axis direction, wherein the value can be entered as the cross-sectional specific coefficient of the porous body 5 entered in step 1005 of the flowchart of FIG. 2 or in step 2005 of the flowchart of FIG. 5.

Further, by calculating $\beta z1 = |\beta1 \sin\theta| + |\beta2 \cos\theta|$, and if βz1 is smaller than β1 or β2, the cross-sectional specific flow resistance in the z axis direction is set as βz1, and if βz1 is equal to or greater than β1 or if βz1 is equal to or greater than β2, then the greater one of β1 or β2 is set as the flow resistance specific to the material in the z-axis direction, wherein the value can be entered as the cross-sectional specific coefficient of the porous body 5 entered in step 1005 of the flowchart of FIG. 2 or in step 2005 of the flowchart of FIG. 5.

The cross-sectional specific flow resistance βy in the y-axis direction can be entered as β2 as the cross-sectional specific coefficient of the porous body 5 entered in step 1005 of the flowchart of FIG. 3 or in step 2005 of the flowchart of FIG. 5.

The above shows an example in which the thickness direction of the porous body 5 is within the X-Z plane, but even if the thickness direction of the porous body is within the X-Y plane or the Y-Z plane, the cross-sectional specific resistances in two directions, one in the thickness direction and one in the direction orthogonal to the thickness direction, can similarly be entered in step 1005 of the flowchart of FIG. 3 or in step 2005 of the flowchart of FIG. 5.

Moreover, in FIG. 5, the thickness direction was determined via the perpendicular line drawn from the contact point of element 1, but the thickness direction can also be determined via the perpendicular line drawn from an arbitrary position, such as the center of the element.

Figure 8:
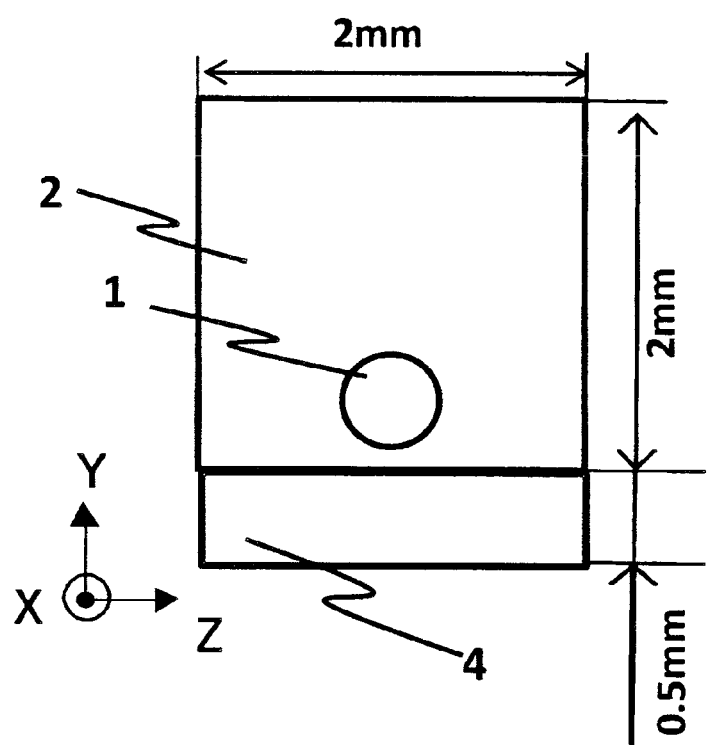
FIG. 8 shows a configuration used for analysis.

The following illustrates an example of analysis using the flowchart of FIG. 3. FIG. 8 shows a configuration used for the analysis. The drawing shows a Y-Z plane of the analysis configuration (center in the X-axis direction), wherein an initial void 1 having a spherical shape with a radius of 0.25 mm is formed in a resin material 3 filled in a porous body 5 having a cubic configuration of 2×2×2 mm. The dimension of the solid member 4 is 1×2×2 mm, wherein the center of the spherical shape is set to correspond to the center in the X-axis direction.

Figure 9:
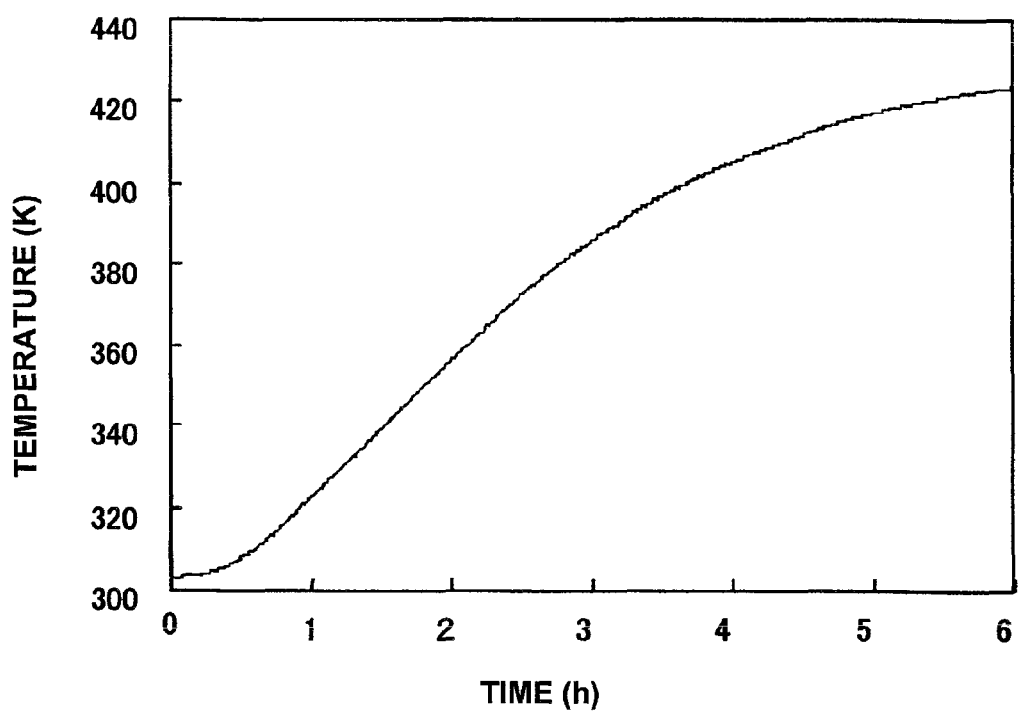
FIG. 9 shows an entered time variation of temperature of the solid member.
Figure 10:
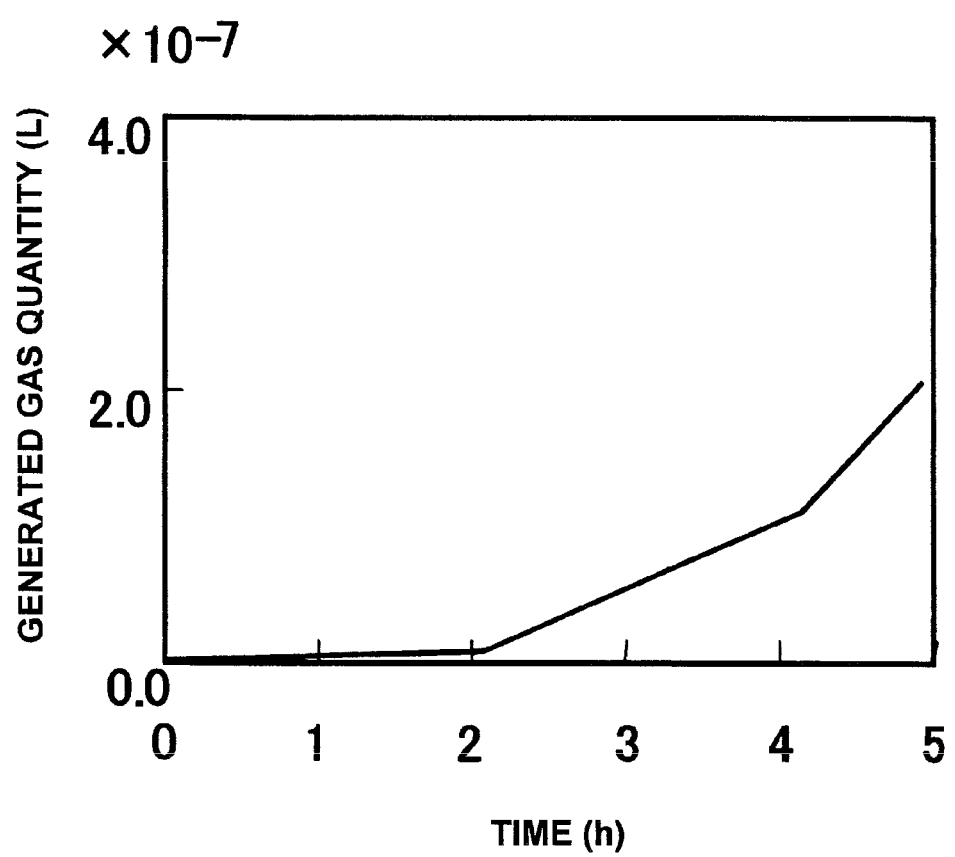
FIG. 10 shows a time variation of temperature of the solid member.

The solid member 4 is designed so that the temperature thereof is raised, wherein the time variation of the temperature is shown in FIG. 9. Further, the volume per unit weight of the gas generated from the solid member 4 is shown in FIG. 10. Here, the time variation of the gas volume generated from the weight of the solid member 4 in contact with the porous body 5 is calculated and entered. The viscosity equations utilize (equation 12) through (equation 15), and the heat generation of the resin is not considered in this example.

In the present example, the cross-sectional specific flow resistance of the porous body 5 in the X and Z directions are 1.1×107 and that in the Y direction is 1.1×1010, and the aperture ratio of the porous body 5 is 0.7.

The values shown in the following table 1 are set as the density, specific heat and thermal conductivity of the resin material 3 and the porous body 5 and the coefficients of the viscosity equation, and the specific heat ratio of the gas within the void is set to a constant value of 1.2.

TABLE 1

| Constant of Viscosity Equation | | | | | |
|---|---|---|---|---|---|
| a | b | d | e | f | g |
| 2.54e−12 | 1.23e4 | 2.22e−4 | 5.04e3 | 2000 | 3.5 |
| Specific Heat (J/(Kg·K)) | | Density (Kg/m³) | | Thermal Conductivity (W/(m·K)) | |
| Property of Resin | | | | | |
| 1000 | | 1.65e3 | | 0.69 | |
| Property of Porous Body | | | | | |
| 1100 | | 2.4e3 | | 1.5 | |

Calculation was performed according to the flowchart of FIG. 3, with the radius of the initial void 1 set to 0.25 mm, the pressure within the initial void 1 set to P0=1 atm, and the gravity added in the negative direction of the Y-axis.

Figure 11:
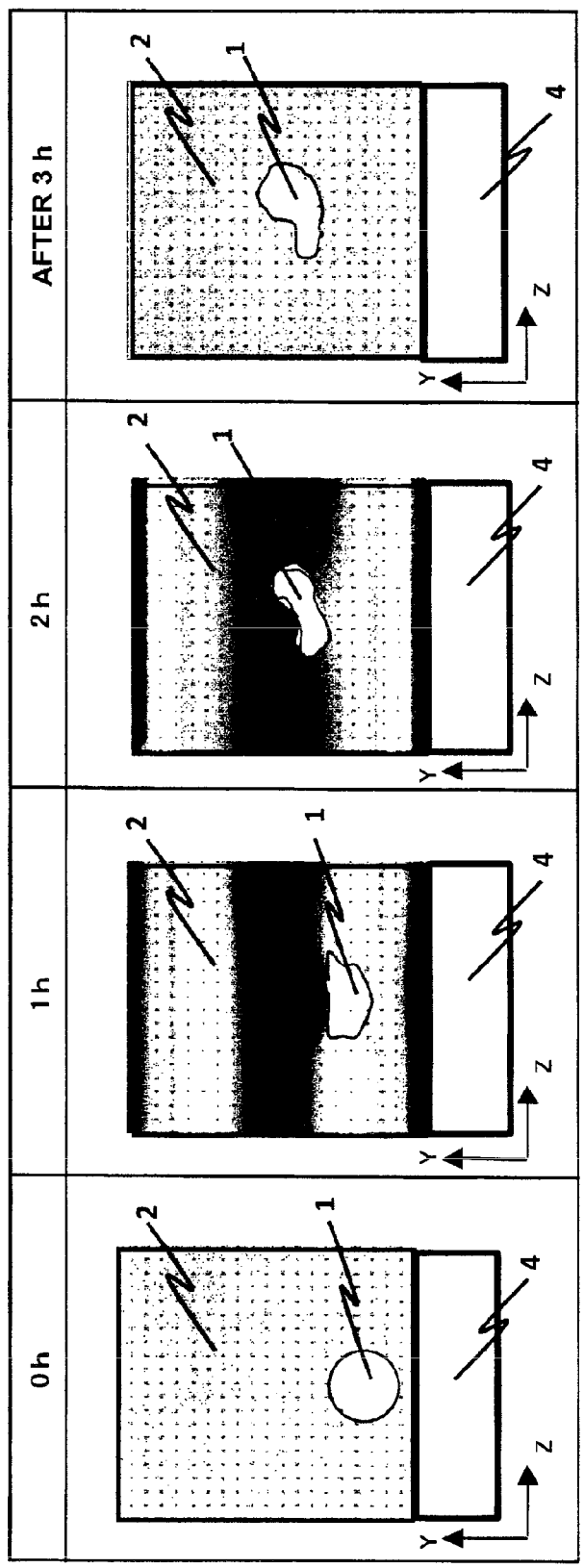
FIG. 11 is a time variation of the change of void volume (Y-Z plane)

The analysis result in the Y-Z plane (center area in the X-axis direction) is shown in FIG. 11. As shown, void 1 moves in the positive direction of the Y-axis via buoyance. The dimension of void 1 in the Y-axis direction is reduced since the cross-sectional specific resistance in the Y-axis direction is high so that the size of void 1 is not increased in the Y-axis direction.

Figure 12:
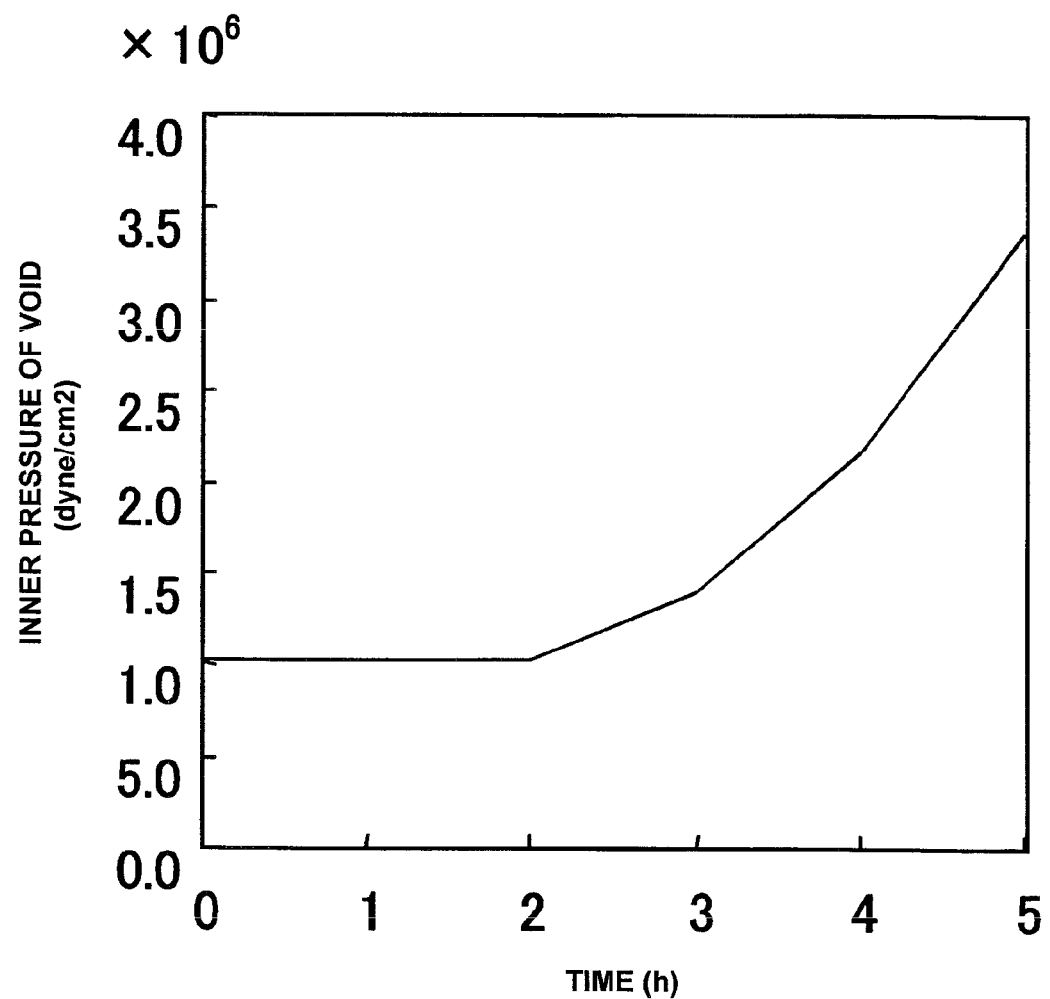
FIG. 12 is a time variation of the inner pressure of void.

FIG. 12 illustrates the time variation of the pressure within the void 1. From zero to two hours, as shown in FIG. 10, the pressure within the void 1 is not changed so much since the amount of gas generated from the solid member 4 is small. On the other hand, the gas pressure within the void 1 is increased after two hours due to the gas generated from the solid member 4.

By utilizing the calculation method for calculating the change of volume of void 1, it becomes possible to alter in a short time through analysis the heating conditions, alter the material of the solid member, and regulate the property of resin such as the viscosity variation of resin to maintain the volume of void 1 generated within the resin by the gas generated from the solid member within a specified value.

[Equation 1]

$$P \cdot V^\gamma = \text{CONSTANT} \tag{1}$$

[Equation 2]

$$PV = nRT \tag{2}$$

[Equation 3]

$$\gamma 1a = \gamma 11 \times (V11/(V11 + V12 + \ldots + V1n)) + \\ \gamma 12 \times (V12/(V11 + V12 + \ldots + V1n)) \ldots + \\ \gamma 1n \times (V1n/(V11 + V12 + \ldots + V1n)) \tag{6}$$

[Equation 4]

$$K = \beta \cdot \eta \tag{16}$$

[Equation 5]

$$dA/dt = (K_1 + K_2 A^M)(1 - A)^N \tag{7}$$

[Equation 6]

$$K_1 = K_a \exp(-E_a/T) \tag{8}$$

[Equation 7]

$$K_2 = K_b \exp(-E_b/T) \tag{9}$$

[Equation 8]

$$A = Q/Q_0 \tag{10}$$

[Equation 9]

$$dQ/dt = Q_0(K_1 + K_2 A^M)(1 - A)^N \tag{11}$$

[Equation 10]

$$\eta = \eta_0 (t + t_0/t - t_0)^{C(T)} \tag{12}$$

[Equation 11]

$$\eta_0 = a \exp(b/T) \tag{13}$$

[Equation 12]

$$t_0 = d \exp(e/T) \tag{14}$$

[Equation 13]

$$C(T) = f/T - g \quad (15)$$

[Equation 14]

$$\nabla \cdot u = 0 \quad (3)$$

[Equation 15]

$$\frac{\partial u}{\partial t} + u \cdot \nabla u = -\frac{1}{\rho}\nabla P + \frac{\mu}{\rho}\nabla^2 \eta + G - Ku \quad (4)$$

[Equation 16]

$$\rho C\left(\frac{\partial T}{\partial t} + u \cdot \nabla T\right) = k\nabla^2 T + \rho\frac{dQ}{dt} + \eta\gamma^2 \quad (5)$$

What is claimed is:

1. A method for predicting volume change of void in a resin material or a resin material filled in a porous body arranged in contact with a solid member, the void being a space in the resin material formed by gas generated from the solid member during rising of temperature, the method comprising:

(a) taking in a configuration of the porous body in which the resin material is filled, a special configuration in which the resin material is filled in contact with the porous body, and data regarding the solid member in contact with a flow region of the resin from a storage device to a computing device, and performing a dissolving process for dissolving the same into three-dimensional solid elements based on the data;

(b) entering properties including at least a density, a thermal conductivity, a specific heat and a viscosity of the resin material, an aperture ratio of the porous body, across-sectional specific resistance of the porous body, a density, a specific heat and a thermal conductivity of the porous body, and boundary conditions comprising an initial temperature of the solid member and the resin material, and a temperature change of the solid member;

(c) entering a time variation of volume of a single gas or a total value of volume of a plurality of gases and a specific heat of the single or the plurality of gases generated from the solid member, the porous body or the resin material in response to the temperature change of the solid member, the porous body or the resin material;

(d) computing an equation of continuity, a Navier-Stokes equation and an energy conservation equation based on the three-dimensional solid elements to thereby calculate the change of resin temperature, calculate the change of viscosity accompanying the change of temperature of the resin material, calculate a function including the cross-sectional specific resistance and the viscosity as a flow resistance factor of the porous body, and enter to the Navier-Stokes equation a product of the flow resistance factor of the porous body and the flow rate and density of the resin as an external force per unit volume of the porous body via fluid resistance;

(e) entering a void volume change by the gas generated from the solid member, the porous body or the resin material, an initial void dimension and an initial time increment regarding an analysis of a flow process of the resin, and calculating the equation of continuity, the Navier-Stokes equation and the energy conservation equation based on the three-dimensional solid elements to thereby compute contents including the change of volume of the void by the generation of gas and the inner pressure of the void;

(f) in the initial time increment of resin flow analysis (first step), computing a gas volume dV1 generated during the initial time increment based on the entered time variation of the gas volume generated from the solid member, wherein t0 represents initial time, Δt1=t1−t0 represents time increment, an initial void is set to have a pressure P0 and a volume V0 at initial time t0, and γ represents specific heat ratio of the generated gas, and regarding the initial time increment, calculating a void pressure P1 and a void volume V1 at t=t1 via fluid analysis using Poisson's equation (1) when P represents pressure, V represents volume, the resin temperature utilizes an average temperature T1 (constant) and the void temperature is assumed to be equal to the resin temperature;

$$P \cdot V^\gamma = \text{constant} \quad (1)$$

(g) in a subsequent time increment (second step), entering a void pressure P1 and a void volume V1 at t=t1 based on the computation result of the first step when the time increment is Δt2=t2−t1, calculating a gas volume dV2 generated in the time region based on the entered time variation of gas volume generated from the solid member, assuming that the void volume is V1 (constant) at t1 in time increment Δt2, calculating a void pressure P2 and a void volume V2 via fluid analysis using said equation (1) assuming that the average temperature is T2 (constant) in time increment Δt2; and (h) repeating the calculation having added the time increment until the time reaches a predetermined time and thereby calculating at least the change in void volume due to the generation of gas.

2. A method for predicting volume change of void in a resin material or a resin material filled in a porous body arranged in contact with a solid member, the void being a space in the resin material formed by gas generated from the solid member during rising of temperature, the method comprising:

(a) taking in a configuration of the porous body in which the resin material is filled, a special configuration in which the resin material is filled in contact with the porous body, and data regarding the solid member in contact with a flow region of the resin from a storage device to a computing device, and performing a dissolving process for dissolving the same into three-dimensional solid elements based on the data;

(b) entering properties including at least a density, a thermal conductivity, a specific heat and a viscosity of the resin material, an aperture ratio of the porous body, across-sectional specific resistance of the porous body, a density, a specific heat and a thermal conductivity of the porous body, and boundary conditions comprising an initial temperature of the solid member and the resin material, and a temperature change of the solid member;

(c) entering a time variation of volume of a single gas or a total value of volume of a plurality of gases and a specific heat of the single or the plurality of gases generated from the solid member, the porous body or the resin material in response to the temperature change of the solid member, the porous body or the resin material;

(d) computing an equation of continuity, a Navier-Stokes equation and an energy conservation equation based on the three-dimensional solid elements to thereby calculate the change of resin temperature, calculate the change of viscosity accompanying the change of temperature of the resin material, calculate a function including the cross-sectional specific resistance and the viscosity as a flow resistance factor of the porous body, and enter to the Navier-Stokes equation a product of the flow resistance factor of the porous body and the flow rate and density of the resin as an external force per unit volume of the porous body via fluid resistance;

(e) entering a change in number of moles of the gas generated from the solid member, the porous body or the resin material, an initial void dimension, an initial time increment regarding an analysis of a flow process of the resin, and calculating the equation of continuity, the Navier-Stokes equation and the energy conservation equation based on the three-dimensional solid elements to thereby compute the flow of the resin material and the void by the generation of gas;

(f) in the initial time increment of resin flow analysis (first step), computing an initial number of gas moles n0 based on state equation (2) when t0 represents initial time, $\Delta t1 = t1 - t0$ represents time increment, an initial void is set having a pressure P0, a volume V0 and a temperature T0 at initial time t0, and wherein R represents gas constant and n represents number of gas moles;

$$PV = nRT \quad (2)$$

calculating the initial number of gas moles n0 using equation (2), wherein γ represents specific heat ratio of the generated gas, calculating a number of gas moles n1 based on the entered time variation of the number of gas moles generated from the solid member during initial time increment t=t0 to t1, calculating a void inner pressure P1 using equation (2) varied via rising of temperature and increased number of moles when void volume is not varied from V0 at t=t0 to t1, when assuming that the resin temperature has an average temperature T1 (constant) and the void temperature is equal to the resin temperature during the initial time increment, calculating via fluid analysis the void pressure and void volume P1' and V1 at t=t1 using said equation (1) using the average temperature T1 (constant) at t=t0 to t1;

(g) in a subsequent time increment (second step), calculating a number of moles n2 generated during the time region based on the entered time change of the number of moles of the gas generated from the solid member when the time increment is $\Delta t2 = t2 - t1$, wherein based on step 1, the pressure at t=t1 is P1', the volume is V1, and at t=t1 to t2, the void volume is V1 (constant) from t1, calculating based on equation (2) a void inner pressure P2 at t=t1 to t2 varied by the rising of temperature and the increase of number of gas moles when the void volume is not varied from V1 and using an average temperature T2 (constant), computing a void pressure and a void volume P2' and V2 via fluid analysis at t=t2 using the equation (1) during t=t1 to t2; and (h) repeating the calculation having added the time increment until the time reaches a predetermined time and thereby calculating the change in void volume at least due to the generation of gas.

3. The method for predicting volume change of void according to claim 1 or claim 2, wherein when the solid member in contact with the flow region of the resin is heated and a plurality of gases are generated, wherein a specific heat ratio of n types of gases generated from the solid member within time range tn1 through tn2 during the temperature rising process is γ11, γ12, γ1n and the volume of the n types of gases generated from the solid member is V11, V12, . . . , V1n, a specific heat ratio γ1a of the overall gases generated from the solid member during the time range tn1 through tn2 is represented by equation (6);

$$\gamma a = \gamma 11 \times (V11/(V11+V12+\ldots+V1n)) + \gamma 12 \times (V12/(V11+V12+\ldots+V1n)) \ldots + \gamma 1n \times (V1n/(V11+V12+\ldots+V1n)) \quad (6)$$

entering the time variation of the specific heat ratio of the overall gases generated from the solid member calculated in equation (6), and calculating at least the change of void volume using the entered specific heat ratio of the overall gases during a calculating time step.

* * * * *